Figure 1:
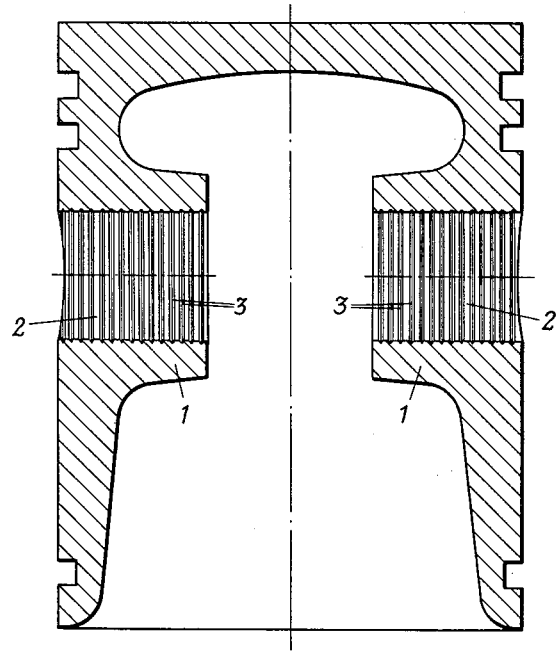

Feb. 27, 1962  S. PACHERNEGG  3,023,060
PISTONS FOR INTERNAL COMBUSTION ENGINES
Filed Nov. 10, 1959

INVENTOR:
SIEGFRIED PACHERNEGG
By:
Watson, Cole, Grindle & Watson
ATTORNEYS

United States Patent Office 3,023,060
Patented Feb. 27, 1962

3,023,060
PISTONS FOR INTERNAL COMBUSTION
ENGINES
Siegfried Pachernegg, Graz, Austria, assignor to
Hans List, Graz, Austria
Filed Nov. 10, 1959, Ser. No. 852,053
Claims priority, application Austria Nov. 10, 1958
3 Claims. (Cl. 309—6)

Several ways and means have been devised in the past for the purpose of reducing wear in the bearing surfaces of gudgeon-pin bosses. These efforts had been prompted by the observation of pitting due to fretting corrosion, from which the principal cause of wear was concluded to be inadequate lubrication. Accordingly, gudgeon-pin bosses have been provided with isolated helical oilways for the purpose of improving lubrication. These oilways were intended to deliver the lubricant in an outwardly direction by means of the progressive rotation of the gudgeon-pin which is known to follow one preferred direction, the pitch of the helical grooves in the two gudgeon-pin bosses extending in opposite direction. Another known attempt at solving this problem provides for a substantially increased gudgeon-pin play in two-stroke pistons so as to produce an adequate wedging effect.

The invention relates to pistons for internal combustion engines with gudgeon-pin bosses the bearing surfaces of which present grooved depressions, considering that the entire bearing surface available for the gudgeon-pin in conventional pistons is much larger than necessary as compared, for example, with the specific surface stress of the small-end hole and of the bearings. It has also been observed that the available supporting area is not at all utilized to the full extent because of elastic and plastic alterations in pistons of this type.

According to the invention, for a gudgeon-pin diameter of 50 millimeters the distance between the grooves or flutes is less than 2 millimeters, preferably measuring 0.8 to 2 millimeters, whereas the supporting surface varies from double to five times the groove area. These grooves or flutes which may be of circular or helical shape depending on the method of production, produce a rough surface as compared with the rather smooth surface finish of conventional design. As a result of this finish, the surface will soon adapt itself in actual operation to the deformations produced, as a result of which a larger bearing area is actually utilized, thereby providing compensation for the loss of bearing area due to the presence of the grooves. At the same time, the grooves or flutes are used for the distribution and storage of the lubricant which can be delivered in any manner known per se through grooves, bores etc. In the case of pistons for two-stroke engines the previously recommended large play which is detrimental to the supporting surface and to the distribution of stress can be largely dispensed with.

The values given above for the distance between grooves and for the ratio between the remaining supporting area and the groove area are subject to alteration depending on the pin diameter. They naturally depend also on individual conditions, in particular on the type of material used and on prevailing stresses.

According to another feature of the invention, the grooves or flutes can be filled with some permanent lubricant such as graphite, ferrous oxyde or molybdenum sulphide in which case means for the supply of lubricant can be partly or wholly dispensed with.

Details of the invention will appear from the following description of an embodiment of the invention with reference to the accompanying drawing in which:

FIGURE 1 shows a diagrammatic view of an axial sectional elevation of a piston according to the invention.

Figure 2:
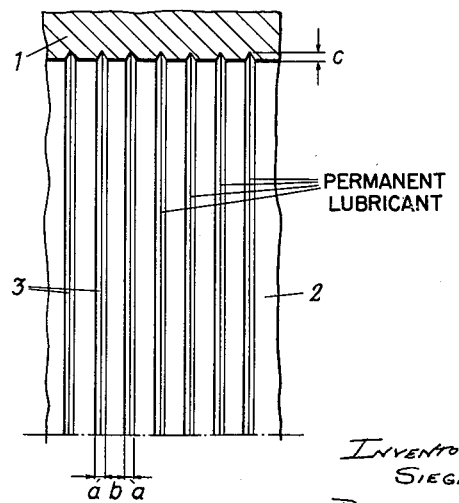

FIGURE 2 being a detail of the above, illustrated on a larger scale.

The bosses 1 present bores 2 in which the gudgeon-pin is located with the usual snug fit. The supporting surfaces formed by the bores 2 are provided with circular grooves 3, which as shown in FIGURE 2 are of triangular cross-section. This cross-section can also be of a different shape as it has practically no influence on the effect of the design, namely the adaptation of the bearing surface to the deformations and on the storage of the lubricant. In actual practice, the depth $c$ of the grooves can be about .2 to 1 millimeter. The ratio between the width $a$ of the grooves and the distance $b$ between the grooves will be chosen in such a way as to produce a 2:1 to 5:1 ratio between the remaining supporting surface and the surface lost due to the presence of the grooves.

The grooves or flutes can also be helical with different angles of helix. These grooves or flutes can not only be directly recessed in the piston material as in the example shown, but bushings of various bearing materials can be inserted without exceeding the scope of the invention, the supporting surfaces of said bushings being provided with suitable grooves. Turning, drilling or spinning operations can be used to produce the said grooves.

I claim:
1. A piston for internal combustion engines comprising gudgeon-pin bosses each with cylindrical bearing surfaces, parallel grooved depressions in the bearing surface, the distance between adjacent grooved depressions being less than 5 millimeters, and the remaining bearing surfaces being two to five times as large as the bearing surfaces taken up by the said grooved depressions.

2. A piston as claimed in claim 1, wherein a permanent lubricant is provided in said grooved depressions.

3. A piston for internal combustion engines comprising gudgeon-pin bosses each with cylindrical bearing surfaces, parallel grooved depressions in the bearing surface, the distance between adjacent grooved depressions being .8 to 2 millimeters, the remaining bearing surfaces being two to five times as large as the bearing surfaces taken up by the said grooved depressions.

References Cited in the file of this patent
UNITED STATES PATENTS

| | | |
|---|---|---|
| 1,600,961 | Payne | Sept. 21, 1926 |
| 2,379,359 | Kettering | June 26, 1945 |
| 2,599,726 | Schluchter | June 10, 1952 |

FOREIGN PATENTS

| | | |
|---|---|---|
| 198,069 | Austria | June 10, 1958 |

OTHER REFERENCES

"Gudgeon Pin Design," Automobile Engineer, volume 44, issue #6, pages 251–255, June 1954.